(12) United States Patent
Brown et al.

(10) Patent No.: US 6,352,668 B1
(45) Date of Patent: Mar. 5, 2002

(54) METHOD AND APPARATUS FOR SELECTIVE DEPOSITION MODELING

(75) Inventors: Joe M. Brown, Valencia; Blake Hyer, Castaic; John Stockwell, Sylmar, all of CA (US)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 09/258,007

(22) Filed: Feb. 25, 1999

(51) Int. Cl.[7] ............................................. B29C 59/04
(52) U.S. Cl. ...................... 264/401; 264/39; 264/308; 425/90; 425/162; 425/230; 425/363; 700/119
(58) Field of Search ...................... 264/401, 39, 308; 425/90, 91, 162, 163, 225, 230, 232, 363, 375; 700/119

(56) References Cited

U.S. PATENT DOCUMENTS 5,532,799 A * 7/1996 Watanabe et al. ........... 399/285
5,594,652 A * 1/1997 Penn et al. .................. 700/119

FOREIGN PATENT DOCUMENTS

WO    97/11835    * 4/1997

\* cited by examiner

*Primary Examiner*—Jeff H. Aftergut
*Assistant Examiner*—Michael A Tolin
(74) *Attorney, Agent, or Firm*—Ralph D'Alessandro

(57) ABSTRACT

Rapid prototyping modeling typically operates by utilizing an ink jet to lay down a thin surface of material as a liquid on a part platform. The material solidifies into a three dimensional object. Computer programs determine the shape of the object, the arrangement of objects and the sequence of objects being built to protect parts of the planarizer roller and planarizer blade of a rapid prototyping machine from erosion.

12 Claims, 3 Drawing Sheets

METHOD AND APPARATUS FOR SELECTIVE DEPOSITION MODELING

BACKGROUND OF THE INVENTION

1. Field of the Invention

It is known that rapid prototype modeling equipment utilize a planarizer to smooth the surface of the object being made by the prototyping method.

2. Description of the Art of Practices

It is known that materials may be melted and re-solidified in order to form solid objects such as in the field of rapid-prototype modeling. The present invention deals with rapid prototype modeling, in particular, with an efficient manner for melting the materials utilized to form the model and to evenly distribute the materials.

Rapid prototyping modeling typically operates by utilizing an ink jet to lay down a thin layer of material as a liquid on a part platform. Computer programs determine the shape of the object to be formed and such cross-sectional data in the program ultimately defines the shape of the object.

In order to ensure that thin layers are formed and that excess material does not build up, a planarizer is utilized to level the surface of the object being built. An element of the planarizer is a roller which effectively evens out the surface of the object to a single layer upon each pass of the ink jet heads utilized to form the object.

Patent Cooperation Treaty Application WO 97/11835 published on Apr. 3, 1997, by Earl, et al. discloses equipment utilizing a planarizer. The disclosure of Patent Cooperation Treaty Application WO 97/11835 is herein incorporated by reference.

SUMMARY OF THE INVENTION

The present invention describes a hot melt machine for building a part from a material wherein the hot melt machine comprises, a part platform, a blade having a length and a width, and a roller having a length and a width, for when in use said roller removes excess material from the part being built on said part platform and said blade removes material from said roller, the improvement therein comprising building a desired part and a phantom part on said part platform such that said roller takes up excess material from the desired part and the phantom part substantially along the length of said roller, wherein an operator determines where the phantom part should be located on said part platform to effect substantial wetting along the length of said roller.

The present invention also describes a hot melt machine for building a part from a material wherein the hot melt machine comprises, a part platform, a blade having a length and a width, and a roller having a length and a width, for when in use said roller removes excess material from the part being built on said part platform and said blade removes material from said roller, the improvement therein comprising building a first desired part and at least one second desired part on said part platform such that said roller takes up excess material from the first desired part and the second desired part substantially along the length of said roller, wherein an operator determines the positioning of the first desired part and the positioning of at least one second desired part on said part platform to effect substantial wetting along the length of said roller when the first desired part and the at least one second desired part are built simultaneously.

Yet another embodiment of the present invention describes a hot melt machine for building a part from a material wherein the hot melt machine comprises, a part platform, a blade having a length and a width, and a roller having a length and a width, for when in use said roller removes excess material from the part being built on said part platform and said blade removes material from said roller, the improvement therein comprising building a first desired part and at least one second desired part on said part platform such that said roller takes up excess material from the first desired part and the second desired part substantially along the length of said roller, wherein an operator determines the positioning of the first desired part and the positioning of at least one second desired part on said part platform to effect substantial wetting along the length of said roller when the first desired part and the at least one second desired part are built sequentially.

Yet still another embodiment of the present invention is a method for building a part on a hot melt machine from a hot melt material wherein the hot melt machine comprises, a part platform, a blade having a length and a width, and a roller having a length and a width, for when in use said roller removes excess material from the part being built on said platform and said blade removes material from said roller, the improvement therein comprising building a desired part and a phantom part on said part platform such that said roller takes up excess material from the desired part and the phantom part substantially along the length of said roller, wherein an operator determines where the phantom part should be located on said part platform to effect substantial wetting along the length of said roller.

A further feature of the present invention is a method for building a part on a hot melt machine from a hot melt material wherein the hot melt machine comprises, a part platform, a blade having a length and a width, and a roller having a length and a width, for when in use said roller removes excess material from the part being built on said part platform and said blade removes material from said roller, the improvement therein comprising building a first desired part and at least one second desired part on said part platform such that said roller takes up excess material from the first desired part and the second desired part substantially along the length of said roller, wherein an operator determines the positioning of the first desired part and the positioning of at least one second desired part on said part platform to effect substantial wetting along the length of said roller when the first desired part and the at least one second desired part are built simultaneously.

Another aspect of the present invention is a method for building a part on a hot melt machine from a hot melt material wherein the hot melt machine comprises, a part platform, a blade having a length and a width, and a roller having a length and a width, for when in use said roller removes excess material from the part being built on said part platform and said blade removes material from said roller, the improvement therein comprising building a first desired part and at least one second desired part on said part platform such that said roller takes up excess material from the first desired part and the second desired part substantially along the length of said roller, wherein an operator determines the positioning of the first desired part and the positioning of at least one second desired part on said part platform to effect substantial wetting along the length of said roller when the first desired part and the at least one second desired part are built sequentially.

BRIEF DESCRIPTION OF THE DRAWINGS

Further features of the present invention will become apparent to those skilled in the art to which the present invention relates from the following specification with reference to the accompanying drawings, in which.

DETAILED DESCRIPTION OF THE INVENTION

Figure 1:
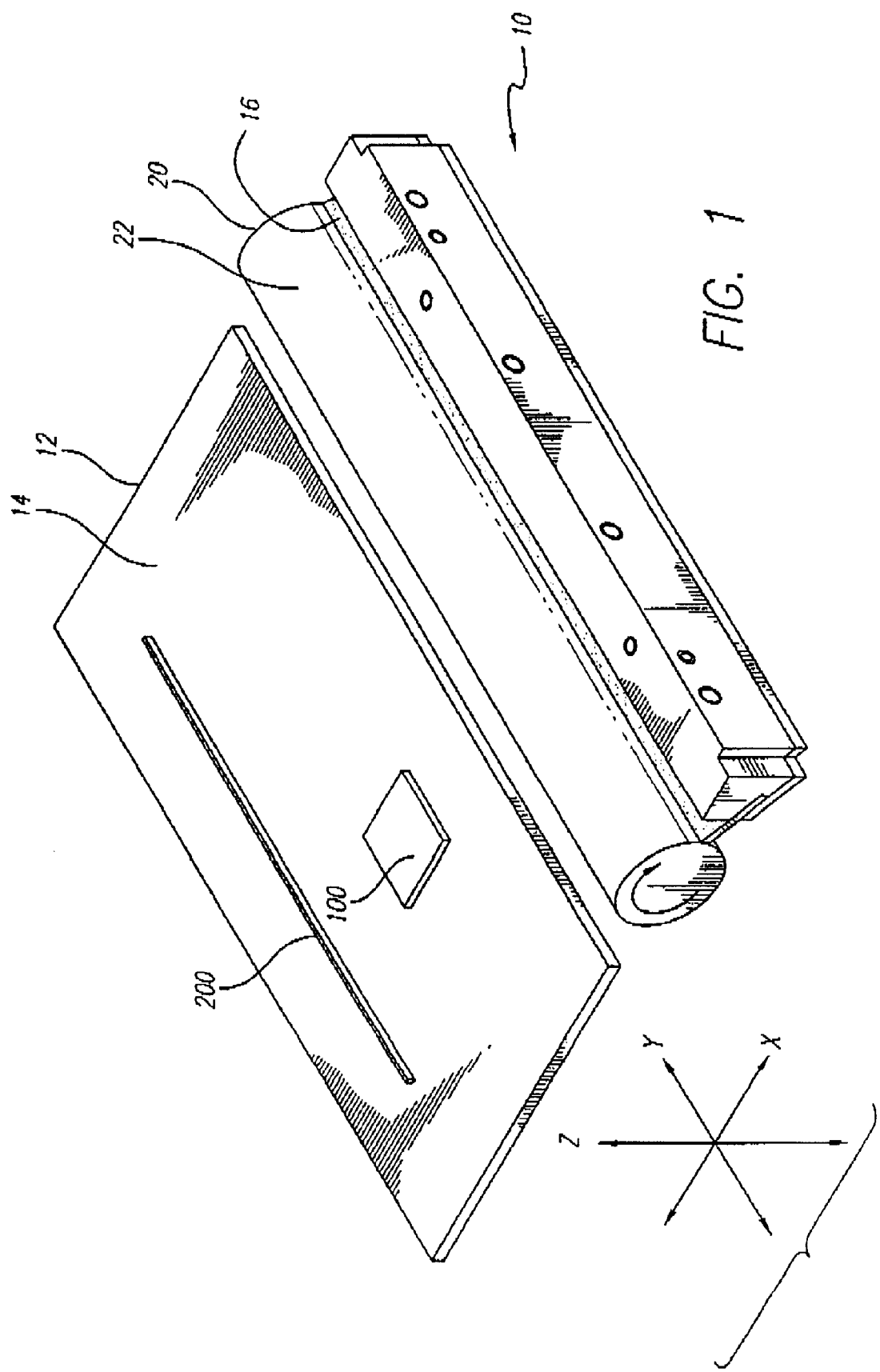
FIG. 1 is a schematic showing the components of a blade assembly and planarizer in use.

A hot-melt machine 10 for building a part from a hot melt material is shown in FIG. 1. The hot-melt machine 10 comprises a part platform 12, a part platform build surface 14, a blade 16 having a length and a width, and a roller 20 having a length and a diameter. The roller 20 has an endless roller surface 22.

As shown in FIG. 1, a part 100 which is a desired part may be manufactured on the hot-melt machine 10. Also shown in FIG. 1 is a phantom part 200.

Figure 2:
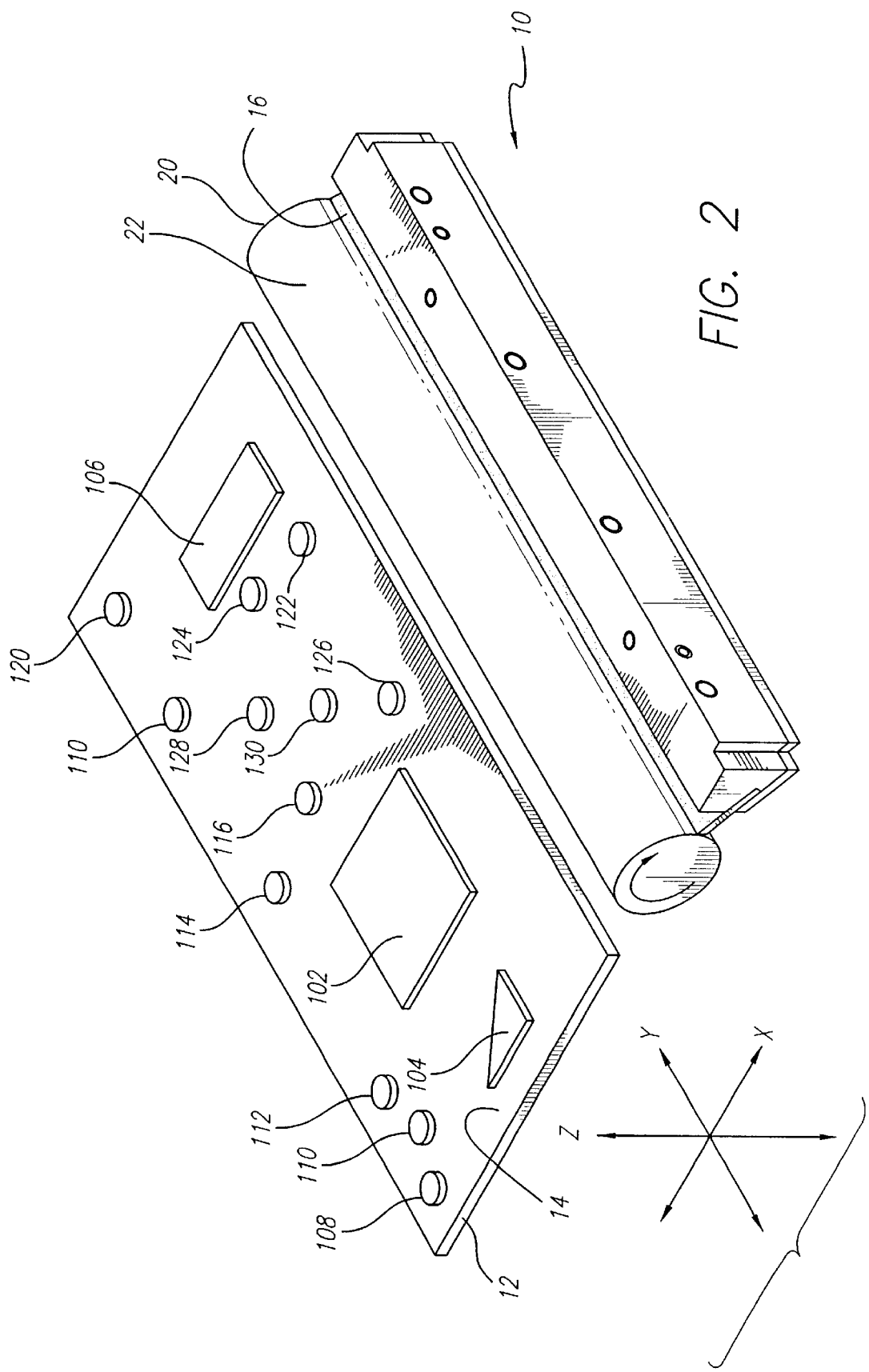
FIG. 2 is a second view of the elements of a blade assembly and planarizer in use; and, FIG. 3 is an alternative view of the arrangement of the parts being built in FIG. 2.

As best seen in FIG. 2, the hot-melt machine 10 has a part platform 12 and a part platform build surface 14 on which a plurality of parts my be built. Also shown in FIG. 2 is a plurality of parts including a three-dimensional triangular shape part 104, a rectangular solid part 102 and a solid second rectangular part 106. A series of cylindrical parts are also present in FIG. 2. and are labeled 108, 110, 112, 114, 116, 118, 120, 122, 124, 126, 128, and 130.

Figure 3:
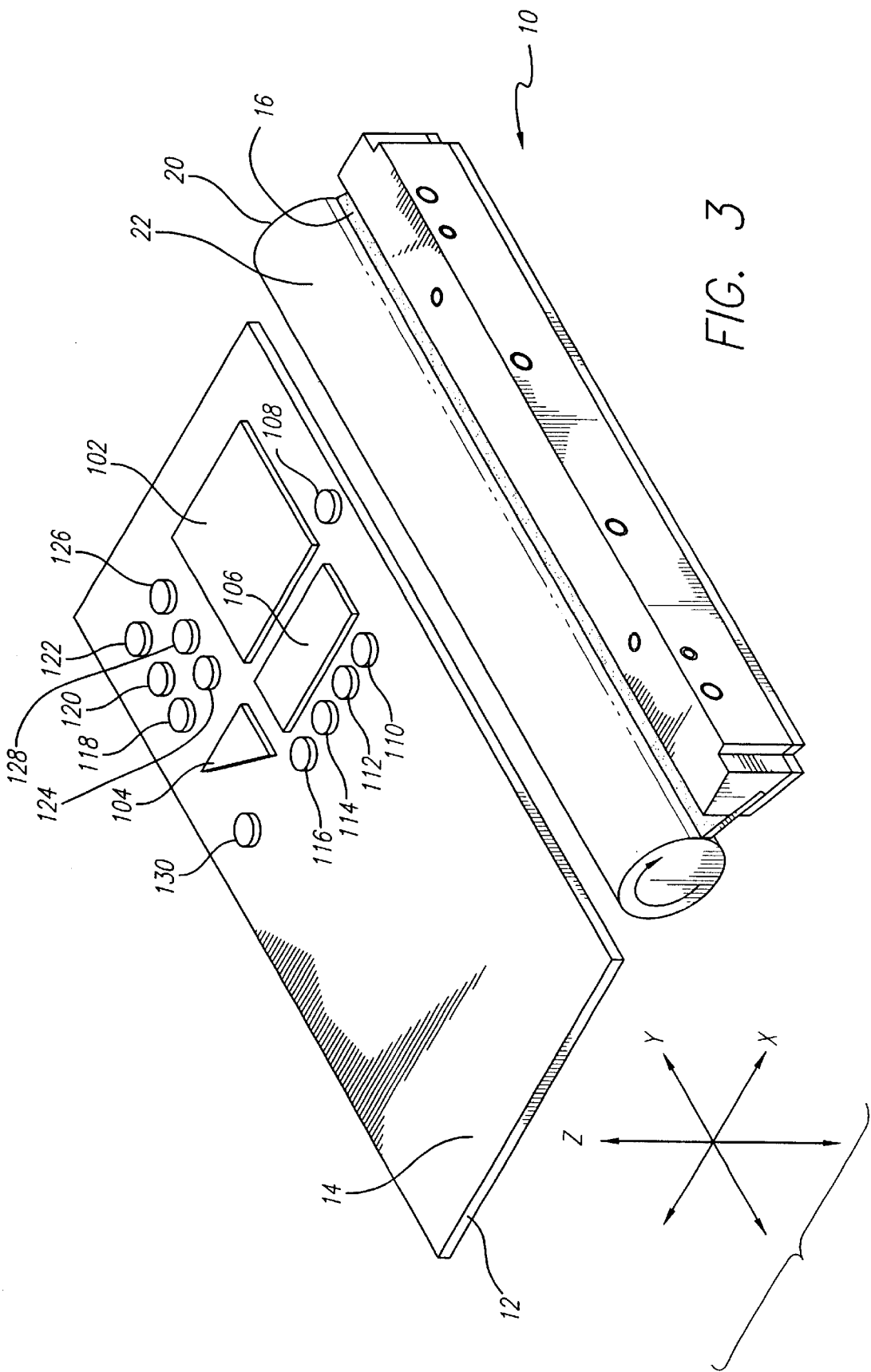

As best shown in FIG. 3, is the hot-melt machine 10 with a blade 16, a roller 20, and an endless roller surface 22 has a part platform 12 having a part platform surface 14 on which parts may be built. The parts shown in FIG. 2 are now shown in FIG. 3. The arrangement of the parts in FIG. 3 is different than that in FIG. 2. Although it is apparent that about the same amount of surface area and material volume are utilized in forming the parts of FIG. 2 and FIG. 3 there are substantial differences in the build process. In FIG. 2, the wetting of the endless roller surface 22 throughout the length of the roller 12 means that there is less friction between the endless roller surface 22 and the blade 16. The friction between the endless roller surface 22 and the blade 16 results in increased energy cost to overcome the friction. The friction also results in erosion of the endless roller surface 22 and the blade 16. The approximate time to build all the parts in FIG. 2 and FIG. 3 is not identical due to down time and friction which is not addressed.

In the practice of the present invention, an operator, conveniently a computer program, determines the order and spacing of the parts to be built. The present invention is directed to maintaining minimal wear on the blade 16 and the endless roller surface 22. The blade surface 16 makes prolonged contact with the endless roller surface 22. Where there is little or no lubricant present the endless roller surface 22 becomes eroded as does the corresponding surface of the blade 16.

Conversely, the wetting of the endless roller surface 22 begins and the wetting of corresponding surface of the blade 16 provides lubricity to those parts. The hot-melt material used to build the parts will effectively wet the blade 16 from the endless roller surface 22 and accordingly wear of the surfaces of the blade 16 and the endless roller surface 22 of the roller 20 will be minimized.

While the ink jet heads are not shown in FIG. 1, it is presumed there is a familiarity with the preparation of rapid prototype modeling through the use of ink jets. In its simplest nature, the hot-melt machine 10 presents a situation where the part platform 12 may move in the direction of the x-axis. The surface of the planarizer moves in the direction of the y-axis. The planarizer also moves in the direction of z-axis as shown. Thus, a part 100 is conveniently built by passing the ink jet head over the part platform surface 14 of the part platform 12 and activating the ink jets in the configuration of the part 100.

If the part 100 is relatively small relative to the lengthwise endless roller surface 22 of the roller 20, then only the corresponding portion of the endless roller surface 22 will be wetted by the hot melt which is being removed from the surface of the part 100. Accordingly, the endless roller surface 22 will only wet a portion of the blade 16. Thus all the surfaces which are not wetted on the endless roller surface 22 and the blade 16 will erode at a more rapid rate than a wetted portion of the endless roller surface 22 and the blade 16.

The proposed solution to the non-wetting of the endless roller surface 22 of the roller 20 and the blade 16 is to build a phantom part 200. As best shown in FIG. 1, the phantom part 200 is an elongated section of a relatively thin material formed from the hot-melt. The phantom part 200 generally corresponds to a lengthwise section of the endless roller surface 22. Thus as the part 100 is being built, the part 200 is also being built (preferably using a minimum amount of material). As the endless roller surface 22 passes over the part 100 on each pass of the roller 20, the traversal in the direction 60 also permits the endless roller surface 22 to move over the phantom part 200.

The phantom part being of the same height in the direction of the z-axis as the desired part 100 causes wetting of the entire endless roller surface 22 of the roller 20. As the endless roller surface 22 of the roller 20 is completely wetted, the blade 16, which scrapes excess material from the endless roller surface 22, is also completely wetted.

Thus, as best shown in FIG. 1, the endless roller surface 22 of the roller 20 and the blade surface 16 will wear approximately evenly. The building of the phantom part 200 may be designated from a catalog of materials by a human operator of the hot-melt equipment 10. Alternatively, it is a computer program which determines the object 100 is far too small to effectively wet the endless roller surface 22 of the roller 20. It is also possible for a human operator of the equipment to override the building of the phantom part 200 should such be desired.

As best shown in FIG. 2, a substantial number of parts are built on the part platform 12 rising from the part platform surface 14. The arrangement of the parts 102, 104, 106, 108, 110, 112, 116, 118, 120, 122, 124, 126, 128, and 130 is accomplished by means of a computer program. The program determines that a number of parts may be built substantially simultaneously. The parts 102, 104, 106, 108, 110, 112, 116, 118, 120, 122, 124, 126, 128, and 130, as may be observed, cover approximately 90 percent of the lengthwise area of endless roller surface 22 of the roller 20. Accordingly, when the parts rise from the part platform surface 14, they are all approximately the same height and will cover more than 90 percent of the endless roller surface 22 of the roller 20. Therefore, the blade 16 is substantially wetted by the endless roller surface 22 of the roller 20. Thus the wear on the blade 16 and the endless roller surface 22 of the roller 20 is minimized by the transfer of material from the parts being built.

FIG. 3 shows the same parts 102, 104, 106, 108, 110, 112, 116, 118, 120, 122, 124, 126, 128, and 130, being built as in FIG. 2. However, the surface area of the part platform 12 is about 50 percent of what is utilized in FIG. 2. Thus the endless roller surface 22 of the roller 20 is only wetted to about 50 percent of the extent that it is as shown in FIG. 2. Therefore, the blade 16 is only wetted in the same approximate surface area that is wetted on endless roller surface 22 of roller 20. Therefore, while half of the roller surface and half of the blade are wetted sufficiently to prevent erosion, the remaining half of the endless roller surface 22 of roller 20 and the half of the blade 16 are not wetted and both are subject to substantial erosion.

In an alternative embodiment, and referring to FIG. 2, it is possible to build parts 102, 104, 106, 108, and 110, in one operation of the hot-melt machine 10. After removing the parts 102, 104, 106, 108, and 110, the parts 112, 116, 118, 120, 122, 124, 126, 128, and 130, are manufactured in a separate operation. While the second embodiment is not as desirable because the endless roller surface 22 of the roller 20 and the blade 16 are not wetted in a single operation; their erosion is minimized. That is, as the parts are being built on different portions of the part platform 12, the wetting takes place sequentially along the endless roller surface 22 of roller 20 and the corresponding area of the blade 16. While the erosion is greater than as shown in the original version of FIG. 2, at least the roller surface erosion is minimized by setting the program to build at different portions of the platform part platform surface 14 over time.

Having described the invention in sufficient detail to allow one of ordinary skill in the art to practice the invention without limitation the following is now claimed.

What is claimed is:

1. A method for building a part on a hot melt machine from a hot melt material, the hot melt machine having a part platform, a blade having a length and a width, and a roller having a length and a width, so that when in use the roller removes excess material from the part being built on the platform and the blade removes material from the roller, the improved method comprising the steps of:

a) building a desired part and a phantom part on the part platform such that the roller takes up excess material from the desired part and the phantom part substantially along the entire length of the roller, and b) determining where the phantom part should be located on the part platform to effect substantial wetting along the entire length of said roller.

2. The method of claim 1 further comprising using machine software to determine phantom part placement.

3. A method for building a part on a hot melt machine from a hot melt material, the hot melt machine having a part platform, a blade having a length and a width, and a roller having a length and a width, so that when in use the roller removes excess material from the part being built on the platform and the blade removes material from the roller, the improved method comprising the steps of:

a) building a desired part and a phantom part on the part platform such that the roller takes up excess material from the desired part and the phantom part substantially along the entire length of the roller, and b) determining the positioning of the first desired part and the positioning of at least one second desired part on the part platform to effect substantial wetting along the entire length of said roller when the first desired part and the at least one second desired part are built simultaneously.

4. The method of claim 3 further comprising using machine software to determine phantom part placement.

5. A method for building a part on a hot melt machine from a hot melt material, the hot melt machine having a part platform, a blade having a length and a width, and a roller having a length and a width, so that when in use the roller removes excess material from the part being built on the part platform and the blade removes material from the roller, the improved method comprising the steps of:

a. building a first desired part and at least one second desired part on the part platform such that the roller takes up excess material from the first desired part and the second desired part substantially along the entire length of the roller, and b. determining the positioning of the first desired part and the positioning of at least one second desired part on the part platform to effect substantial wetting along the entire length of said roller when the first desired part and the at least one second desired part are built sequentially.

6. The method of claim 5 further comprising using machine software to determine the positioning of the first desired part and of the at least one second desired part.

7. A hot melt machine for building a part from a material having a part platform on which the part is built, a blade having a length and a width, and a roller having a length and a width, the roller removing excess material from the part being built on the part platform and the blade removing material from said roller, the improvement comprises building a desired part and a phantom part on the part platform such that the roller takes up excess material from the desired part and the phantom part substantially along the length of the roller, and equipment with software to determine where the phantom part should be located on the part platform to effect substantial wetting along the entire length of the roller.

8. The hot melt machine of claim 7 wherein the software may be overridden by a human operator.

9. A hot melt machine for building a part from a material having a part platform on which the part is built, a blade having a length and a width, and a roller having a length and a width, the roller removing excess material from the part being built on the part platform and the blade removing material from the roller, the improvement comprises building a first desired part and at least one second desired part on the part platform such that the roller takes up excess material from the first desired part and the second desired part substantially along the entire length of the roller, and equipment with software to determine the positioning of the first desired part and the positioning of at least one second desired part on the part platform to effect substantial wetting along the entire length of said roller when the first desired part and the at least one second desired part are built simultaneously.

10. The hot melt machine of claim 9 wherein the software may be overridden by a human operator.

11. A hot melt machine for building a part from a material having a part platform on which the part is built, a blade having a length and a width, and a roller having a length and a width, the roller removing excess material from the part being built on the part platform and the blade removes material from the roller, the improvement comprises building a first desired part and at least one second desired part on the part platform such that the roller takes up excess material from the first desired part and at least one second desired part substantially along the entire length of the roller, and equipment with software to determine the positioning of the first desired part and the positioning of at least one second desired part on the part platform to effect substantial wetting along the entire length of the roller when the first desired part and the at least one second desired part are built sequentially.

12. The hot melt machine of claim 11 wherein the operator software may be overridden by a human operator.

* * * * *

UNITED STATES PATENT AND TRADEMARK OFFICE
CERTIFICATE OF CORRECTION

PATENT NO.    : 6,352,668 B1
DATED         : March 5, 2002
INVENTOR(S)   : Joe M. Brown et al.

It is certified that error appears in the above-identified patent and that said Letters Patent is hereby corrected as shown below:

<u>Column 1,</u>
Line 48, "substantial wefting along" should read -- substantial wetting along --.

<u>Column 3,</u>
Line 39, "wefting of the" should read -- wetting of the --.

Signed and Sealed this

Sixteenth Day of December, 2003

JAMES E. ROGAN
*Director of the United States Patent and Trademark Office*